(12) United States Patent
Bueter

(10) Patent No.: US 9,958,069 B2
(45) Date of Patent: May 1, 2018

(54) PISTON UNIT OF A WORKING CYLINDER

(71) Applicants: BÜMACH ENGINEERING INTERNATIONAL B.V., Emmen (NL); Josef Bueter, Haren/Altenberge (DE)

(72) Inventor: Josef Bueter, Haren/Altenberge (DE)

(73) Assignee: Buemach Engineering International B.V., Ta Emmen (NL)

( * ) Notice: Subject to any disclaimer, the term of this patent is extended or adjusted under 35 U.S.C. 154(b) by 405 days.

(21) Appl. No.: 14/429,455

(22) PCT Filed: Sep. 19, 2013

(86) PCT No.: PCT/DE2013/000531
§ 371 (c)(1),
(2) Date: Mar. 19, 2015

(87) PCT Pub. No.: WO2014/044243
PCT Pub. Date: Mar. 27, 2014

(65) Prior Publication Data
US 2015/0226325 A1    Aug. 13, 2015

(30) Foreign Application Priority Data

Sep. 19, 2012 (DE) .................. 20 2012 008 999 U

(51) Int. Cl.
*F16J 1/12* (2006.01)
*F16J 1/10* (2006.01)
(Continued)

(52) U.S. Cl.
CPC ............. *F16J 1/10* (2013.01); *F15B 15/1447* (2013.01); *F16J 15/00* (2013.01); *F16B 21/186* (2013.01); *F16J 1/12* (2013.01)

(58) Field of Classification Search
CPC .......... F16B 21/183; F16B 21/186; F16J 1/12
See application file for complete search history.

(56) References Cited

U.S. PATENT DOCUMENTS 4,635,974 A * 1/1987 Moussaian ............ F16B 21/186
285/305
5,030,148 A 7/1991 Funami et al.
(Continued)

FOREIGN PATENT DOCUMENTS

FR    1135349 A    4/1957
FR    1363852 A    6/1964
(Continued)

*Primary Examiner* — F. Daniel Lopez
(74) *Attorney, Agent, or Firm* — Laurence A. Greenberg; Werner H. Stemer; Ralph E. Locher

(57) ABSTRACT

A piston unit of a working cylinder has first and second coupling partners. The first coupling partner is a piston. The second coupling partner is a piston rod. The piston rod is inserted axially into the piston. Each of the coupling partners has an annular groove, the groove of the piston rod is an external groove, the groove of the piston is an internal groove. The grooves of the coupling partners lie opposite one another. The unit has a spring-loaded coupling ring. The coupling ring, when deformed in a tensioning direction, is fully accommodated by the groove of one coupling partner and which, when deformed in a release direction, engages in the grooves of both coupling partners. The engagement of the coupling ring in the grooves produces a form-locking connection between the partners. The piston rod is oversized in relation to the piston and provides an additional frictional connection.

9 Claims, 8 Drawing Sheets

(51) Int. Cl.
 *F15B 15/14* (2006.01)
 *F16J 15/00* (2006.01)
 *F16B 21/18* (2006.01)

(56) References Cited

U.S. PATENT DOCUMENTS

| | | | |
|---|---|---|---|
| 5,603,532 A * | 2/1997 | Guest | F16B 13/0875 285/305 |
| 2006/0083582 A1* | 4/2006 | Balsells | F16B 21/18 403/325 |
| 2006/0156657 A1* | 7/2006 | Commins | E04B 1/2604 52/223.13 |
| 2009/0110476 A1 | 4/2009 | Patzelt | |

FOREIGN PATENT DOCUMENTS

| | | |
|---|---|---|
| JP | S4925944 U | 3/1974 |
| JP | S5620114 U | 2/1981 |
| JP | H0777223 A | 3/1995 |
| JP | H08219115 A | 8/1996 |
| JP | H1131068 A | 2/1999 |
| JP | 2001165118 A | 6/2001 |

* cited by examiner

PISTON UNIT OF A WORKING CYLINDER

BACKGROUND OF THE INVENTION

Field of the Invention

The invention relates to a piston unit of a working cylinder, provided in particular as a hydraulic or pneumatic pressurized-flow consumer.

Working cylinders as hydraulic or pneumatic pressurized-flow consumers comprising a piston unit are generally known from the prior art.

Working cylinders of said type are generally of multi-part form, wherein the piston unit is composed of a piston and of a piston rod connected to said piston.

The connection between the piston and the piston rod is in this case realized, in a known manner, by way of a positively locking and/or non-positively locking and/or cohesive connection, wherein the connection may be releasable or non-releasable depending on the application.

In the narrower sense, releasable connections are in this case normally realized by means of screw connections between the piston and the piston rod or by means of fit connections, whereas the non-releasable connections are generally provided by welding, brazing or adhesive bonding of the piston to the piston rod.

Furthermore, it is known from the prior art for components of a piston unit, in particular piston and piston rod, to be connected to one another in positively locking fashion by means of a coupling ring.

For this purpose, the components to be connected have respectively corresponding annular grooves into which the coupling ring engages and thus provides the positive locking between the components.

A disadvantage of such connections lies in the fact that the coupling ring has a certain undersize in relation to the width of the annular grooves in order that the coupling ring can assume its final position in the annular grooves during the assembly process. This results in a minimal clearance which, in the event of changes in the load state of the piston unit, can lead to minimal axial relative movements between the piston and piston rod.

Owing to these relative movements, the seal elements provided between the components are subjected to undesired abrasion grinding phenomena, which in the worst case lead to a defect of any seal elements that may be provided, and thus to failure of the working cylinder. Furthermore, the clearance can increase further as a result of the dynamic processes and associated abrasion in the region of annular grooves and coupling ring too.

BRIEF SUMMARY OF THE INVENTION

It is therefore an object of the invention to provide a piston unit for a working cylinder, which piston unit is particularly simple and inexpensive to produce and at the same time exhibits high endurance strength and thus a lengthened service life.

The object is achieved by means of the features specified in the independent claims. Preferred refinements will emerge from the subclaims.

A piston unit according to the invention of a working cylinder has a first coupling partner and a second coupling partner. The first coupling partner is in this case in the form of a piston and the second coupling partner is in the form of a piston rod.

Furthermore, according to the invention, the second coupling partner is inserted into the first coupling partner.

In this context, "inserted" is to be understood to mean that the second coupling partner is engaged around radially by the first coupling partner.

The technical solution can be used both in the case of a piston unit in which the piston rod is inserted only in sections into the piston and the piston is formed with a closed base, as is generally the case, for example, with a differential working cylinder, and in the case of a piston unit in which a continuous piston rod extends through the piston, as is the case, for example, with a synchronization cylinder.

According to the invention, the piston unit is distinguished by the fact that the coupling partners each have an annular groove which is preferably of encircling form, wherein the annular groove of the inserted coupling partner is formed by an external groove and the annular groove of the other coupling partner is formed by an internal groove.

According to the invention, the axial positioning of the annular groove in the coupling partners is in this case such that the annular grooves are situated correspondingly opposite one another when the coupling partners are in the coupled state.

In this context, "situated correspondingly opposite" is to be understood to mean that the opening regions of the annular grooves face toward one another and, as viewed in the axial direction of the working cylinder, are situated at the same level.

Furthermore, a piston unit according to the invention has a coupling ring which can be elastically braced.

Said coupling ring, when elastically deformed in its radial bracing direction, can be fully received in the annular groove of one coupling partner.

In this case, the radial bracing direction describes the deformation direction of the coupling ring in which said coupling ring is deformed under the action of an external radial force, whereby a radial preload is generated in the coupling ring.

In this case, according to the invention, depending on the application, it is possible for the annular groove which fully receives the coupling ring to be arranged either in the first coupling partner, that is to say the piston, or in the second coupling partner, that is to say the piston rod.

An arrangement in which the annular groove which fully receives the coupling ring is provided in the piston is particularly advantageous in particular when the piston rod is to be of hollow form with a relatively small wall thickness.

It is particularly advantageously the case that the coupling ring is fully received in the annular groove of a coupling partner to just such an extent as to ensure that the second coupling partner can be inserted in unimpeded fashion into the first coupling partner.

According to the invention, for this purpose, the annular groove which fully receives the coupling ring has an expansion space into which the coupling ring can deflect as the coupling partners are inserted one into the other.

When a final assembled position is assumed, that is to say when the coupling partners are positioned relative to one another such that the annular grooves thereof are situated correspondingly opposite one another, the coupling ring deforms, according to the invention, in its relaxation direction.

In this connection, the relaxation direction describes the deformation direction of the coupling ring in which said coupling ring deforms owing to the acting preload.

The deformation of the coupling ring in its relaxation direction particularly advantageously has the effect that, in the final assembled position, said coupling ring protrudes into and thus engages with the annular groove of the other coupling partner. Abutment of the axial outer walls of the coupling ring against the axial walls of the annular grooves of the two coupling partners has the effect of providing a positively locking connection between the coupling partners. The coupling partners are fixed in their axial relative position with respect to one another by the positive locking. Axial forces exert a shear load on the coupling ring. The solution according to the invention also encompasses the possibility of multiple coupling rings being arranged, so as to abut against one another axially, in an annular groove pair of correspondingly broad form, in order that high shear forces can be accommodated. It is preferably the case that, in the coupled state, the coupling ring bears by way of its radially external wall resiliently against the groove base wall of the annular groove of the other coupling partner, such that said coupling ring is reliably fixed in its position.

By means of the proposed solution, a piston unit of a working cylinder is thus provided in which the required coupling partners are connectable to one another exclusively through the use of a load-bearing coupling ring, wherein the connection is realized in a particularly simple manner by virtue of the coupling partners being inserted one into the other.

This coupling solution reduces the manufacturing, material and assembly costs, which in turn have a considerable influence on the reduction of energy costs.

Adverse effects arising from the action of heat, such as may be encountered for example in the case of a shrink-fit coupling or in the case of a welded connection, are eliminated.

In relation to known solutions, a piston unit according to the invention thus has the technological advantages firstly that said piston unit is particularly easy to produce and, furthermore, no additional method steps are required, in particular for the production of a cohesive connection between the coupling partners, whereby in particular, the production costs for a piston unit of said type can be lowered, since the assembly and energy costs are reduced.

Furthermore, a piston unit according to the invention is characterized, in relation to conventional devices, by greater endurance strength and thus a lengthened service life. As a further major advantage, all angular positions of the coupling partners relative to one another, and thus the orientation of the piston in the cylinder, can be realized without any problem or additional outlay.

The piston unit according to the invention is furthermore characterized in that the second coupling partner, which is to be inserted, has a corresponding oversize in relation to an internal dimension of the first coupling partner, and in that, in the final assembled position, there is thus an interference fit between the coupling partners. The interference fit produces frictional locking between the coupling partners. Axially acting forces can be accommodated by way of the frictional locking. Furthermore, the coupling partners are secured so as to be prevented from twisting.

In this way, as a special technological advantage of the solution, a hybrid coupling action is realized which is composed of a non-positive locking coupling action effected by the interference fit and a positive locking coupling action effected by the coupling ring, said hybrid coupling action being distinguished by an increase of the maximum axial forces that can be accommodated and by an improvement in the endurance strength of the piston unit. The forces to be accommodated axially can be divided between the two coupling actions, wherein the ratio can be set through design measures.

The two coupling partners are fixed to one another axially without a clearance by way of the frictional locking. Thus, as a special advantage, any axial movement of the coupling partners relative to one another in the event of alternation between the piston unit being subjected to load and being relieved of load during intended operation, which axial movement could for example lead to damage of any seal elements that are provided, can be prevented.

Such seal elements are provided in particular in the case of synchronization cylinders, in which the piston rod extends through the piston, and serve for preventing a passage of a working medium from one working chamber of the synchronization cylinder into the other working chamber.

According to the invention, the positive locking connection by way of the coupling ring and the non-positively locking connection by way of the frictional locking between the coupling partners act together.

In particular, in the case of piston units of single-acting working cylinders, the frictional locking has the effect that the relative position assumed by the coupling partners under high loads, which relative position corresponds to a clearance end position of the coupling ring with respect to the axial side walls of the annular grooves, is maintained even in the event of a change in load state. The frictional locking is thus overcome at least in the presence of full operating pressure, such that the coupling partners are moved into the clearance end position and, there, are prevented from further axial relative movement by the positive locking.

However, the frictional locking prevents an axial return movement out of said clearance end position and thus fixes the coupling partners relative to one another in the relative position of the clearance end position. This applies correspondingly in the case of a piston unit of a differential working cylinder, in which the force that can be exerted on the piston from the piston rod chamber side is lower than the force that can be accommodated by the non-positively locking connection effected by the frictional locking, whereas the force that can be exerted on the piston from the piston base chamber side is however greater.

By means of the proposed solution, a piston unit of a working cylinder is thus provided in which, firstly, the required coupling partners are connectable to one another in positively locking fashion through the use of a load-bearing coupling ring, wherein the connection is realized in a particularly simple manner by virtue of the coupling partners being inserted one into the other.

Secondly, a relative movement between the coupling partners is fully prevented by the frictional locking that is realized.

According to the invention, it may furthermore likewise be provided that the axial forces are accommodated solely by the non-positively locking interference fit, wherein the positive locking effected by the coupling ring acts in this case merely as a safeguard for preventing the inserted second coupling partner from being pulled out of the first coupling partner. In this case, as a special advantage, it is made possible for the non-positively locking interference fit, including the contact surfaces required therefor, to be dimensioned in accordance with the normative load states, but at the same time, by means of the additional positively locking connection by means of the coupling ring, critical overloads can be reliably accommodated.

In a preferred refinement of the invention, the piston rod is in the form of a hollow element.

Such an embodiment as a hollow element permits the provision of a particularly lightweight piston rod and thus an optimization of the overall weight of a piston unit having a piston rod designed in this way.

Furthermore, according to the invention, in the case of a hollow form of the piston rod, the annular groove which fully receives the coupling ring is arranged in the piston, whereby it is particularly advantageously the case that structural weakening of the piston rod owing to a correspondingly deep annular groove is avoided.

In a further advantageous variant of the invention, the coupling ring or the coupling partner which does not fully receive the coupling ring has a run-on bevel.

As one coupling partner is inserted into the other coupling partner, said run-on bevel causes the coupling ring to be braced and the coupling ring to be fully received in the respective annular groove of the coupling partner which fully receives the coupling ring.

Thus, as a special technological advantage, it is not necessary for the coupling ring to be installed into the annular groove, which fully receives it, of the respective coupling partner by way of additional apparatuses or expenditure of effort before the coupling partners are inserted one into the other.

With regard to the run-on bevel, it is self-evident to a person skilled in the art that, in special configurations, in particular of the coupling ring, it is also possible for multiple individual run-on bevels to be provided on the respective coupling partner instead of a single run-on bevel.

In particular in the case of the piston unit being used with a continuous piston rod, for example within a synchronization cylinder, the invention provides for a sealing element to be arranged between the two coupling partners, which sealing element, in the region of the positively locking connection, prevents a passage of a working medium from one working chamber into the other working chamber of the synchronization cylinder.

During insertion of the second coupling partner into the first coupling partner, a sealing element of said type can particularly advantageously be held in the first coupling partner in the region of the run-on bevel of the second coupling partner, and thus particularly simple installation of the sealing element can be ensured.

In a preferred refinement, the coupling partners of a piston unit according to the invention have further, axially offset annular grooves for receiving further, likewise axially offset coupling rings.

The provision of multiple annular grooves and multiple coupling rings is advantageous in particular when the connection is to be subjected to high axial forces during use of the working cylinder which accommodates the piston unit.

To ensure that the coupling partners are inserted one into the other reliably and without damage even in the case of multiple coupling rings being arranged between the coupling partners, the annular grooves preferably likewise have run-on bevels, wherein the run-on bevels cause the multiple coupling rings to once again be fully received in the respective annular grooves of the coupling partner which fully receives the coupling rings.

Furthermore, a further advantageous variant of the invention provides that the coupling ring has a circular cross section.

At the same time, the geometrical contour of the annular groove of the coupling partner which does not fully receive the coupling ring is preferably at least partially adapted to the circular cross section of the coupling ring. One advantage here consists in that, when the positively locking connection of the coupling partners is subjected to load, the notch effects arising in the annular groove of the coupling partner which does not fully receive the coupling ring can be reduced in an effective manner in relation to an annular groove of rectangular cross section.

To reduce the notch effects arising in the other coupling partner, the annular groove thereof may likewise have a rounded contour in its groove base.

In relation to coupling rings with a rectangular cross section, a coupling ring according to the invention with circular cross section has a more expedient stress profile in its interior under the action of load, whereby in particular, the durability of the positively locking connection of the piston unit can be yet further improved.

At the same time, a coupling ring with circular cross section can be produced particularly easily and inexpensively.

A likewise advantageous refinement of the invention presents a simple but effective way of achieving a further improvement. A piston rod preferably exhibits higher material quality, in particular a higher modulus of elasticity, than a piston. To keep the surface pressure at the side walls within the surface pressure values admissible for the specific material, but at the same time to also avoid forming the annular grooves to be deeper than required, the solution was arrived at in which that the coupling ring, in its engaged position, can engage with a greater area of overlap into the coupling partner with the lower modulus of elasticity. The area of overlap is to be understood to mean that part of the area of the axially directed side wall of the coupling ring by which said coupling ring bears under axial load against the side wall of the groove of a coupling partner. The areas of overlap may in this case be defined in a simple manner by the depth of the annular groove of the coupling partner which does not fully receive the coupling ring and the width of the axially directed side wall of the coupling ring. In combination with the preferred embodiment, in which the piston rod is in the form of a hollow element, the depth of the annular groove in the piston rod can be made very small, whereas the coupling ring, in the engaged position, engages into the piston to a correspondingly greater depth.

In a further advantageous refinement of the invention, the coupling ring is of conical form.

In this context, a conical design is to be understood to mean that the coupling ring has a rectangular cross section and that, owing to the rectangular cross section, on an axial top side and the bottom side of the coupling ring, two different ring diameters are formed, wherein the conical form in this case has the effect that the ring diameter of the top side of the coupling ring is smaller than the ring diameter of the bottom side. The radial delimiting surfaces thus correspond to the lateral surface of a flat frustum.

At the same time, the annular groove of the coupling partner which does not fully receive the coupling ring is formed such that, when the coupling ring is deformed in the relaxation direction, the conical coupling ring pivots into the corresponding annular groove and, after the relaxation of said coupling ring, it is possible for the two axial walls of the conical coupling ring to bear substantially over the full area against the respectively corresponding wall of the two annular grooves. To realize the formability of a conical coupling ring, said coupling ring is of segmented form, wherein this may be realized in particular by way of axial incisions or by virtue of the coupling ring being formed in multiple parts. It is possible to realize an expedient, relatively low surface pressure, which is advantageous in particular in the case of a relatively low-grade material in particular of a piston, with a simultaneously narrow form of the coupling ring. In this way, it is simultaneously achieved as a special advantage that the annular groove which fully receives the coupling ring need merely be designed to be of a depth corresponding to the width of the ring cross section of the conical coupling ring.

By means of such a conical form of the coupling ring, a particularly reliable and durable connection of the coupling partners is realized.

Furthermore, a particularly advantageous embodiment of the invention provides that an elastic element is provided in the annular groove, which fully receives the coupling ring, of the respective coupling partner.

According to the invention, said elastic element is designed so as to act radially on the coupling ring and thus optimize the deformation thereof in the relaxation direction.

The elastic element thus advantageously permits, in a particularly simple manner, a reliable deformation of the coupling ring in its relaxation direction at every point, whereby correct seating of the coupling ring in the annular grooves of the coupling partners can be ensured over the entire length of said coupling ring.

In this case, the elastic element may also serve entirely on its own to realize the capacity for resilient bracing of the coupling ring, thus permitting optimization of the material of the coupling ring.

In a preferred refinement of the piston unit according to the invention, access openings are provided in the externally situated coupling partner, which access openings permit in particular mechanical manipulation of the coupling ring from the outside.

By way of the mechanical manipulation of the coupling ring, said coupling ring is, when required, pressed into the annular groove, which fully receives the coupling ring, of the first or second coupling partner to such an extent that a release of the positively locking connection between the two coupling partners is effected. The coupling partners can thereafter be pulled apart again.

The mechanical manipulation may in this case preferably be realized by way of screws or even simply by way of pins which, using a special tool, are displaced inward until the coupling ring passes beyond the joint plane of the two coupling partners, and thus the positive locking is eliminated.

It is thus possible, as a special technological advantage, to provide a releasable connection between the coupling partners of a piston unit according to the invention, which permits disassembly of the coupling partners, and repair or alteration if necessary.

BRIEF DESCRIPTION OF THE SEVERAL VIEWS OF THE DRAWING

The invention will be explained in more detail below, on the basis of exemplary embodiments, with reference to.

DESCRIPTION OF THE INVENTION

Figure 1:
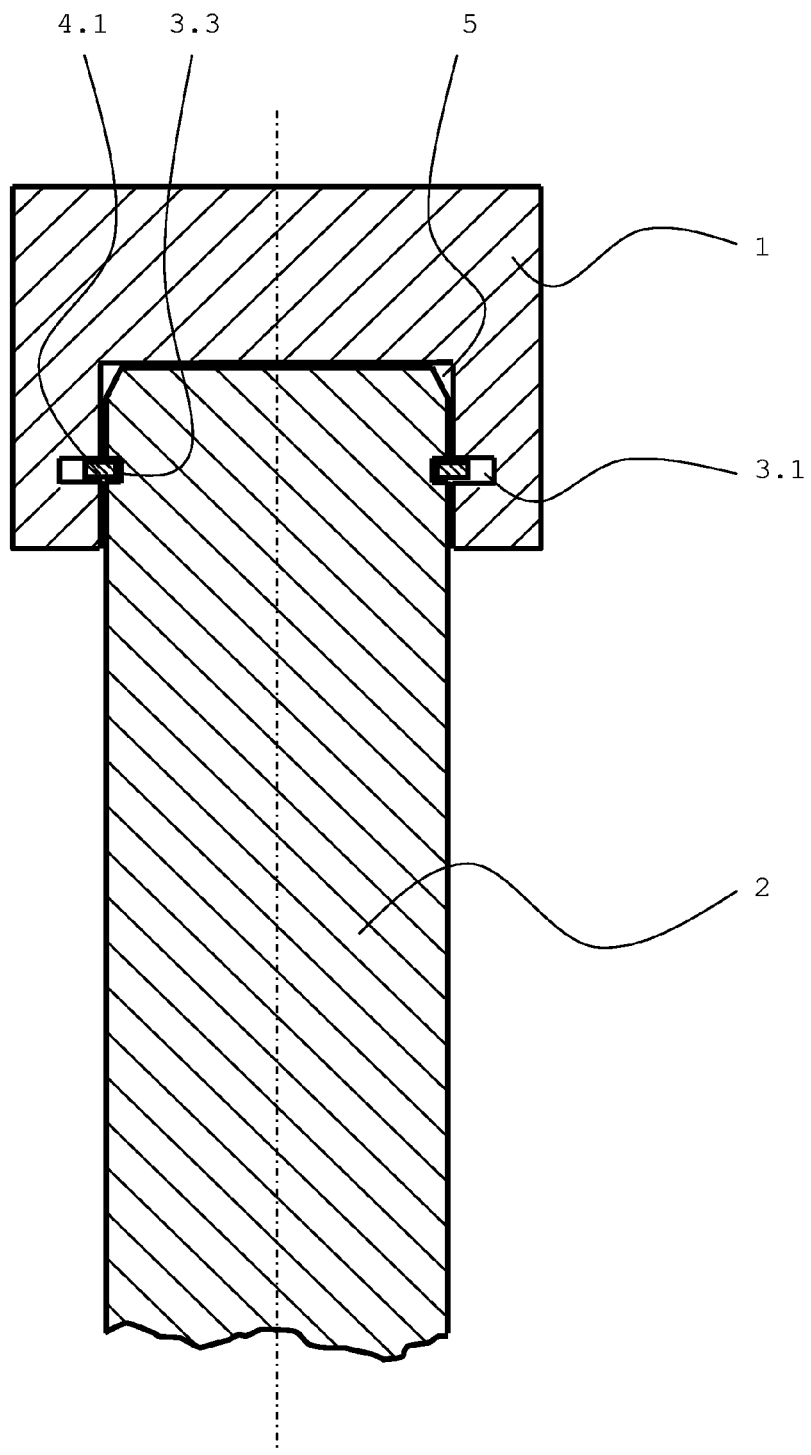
FIG. 1 which shows a sectional illustration of a piston unit with a coupling ring, FIG. 2 which shows a half-section of a piston unit with two coupling rings, FIG. 3 which shows a half-section of a piston unit with circular coupling ring cross section, FIG. 4 which shows a half-section of a piston unit with a conical coupling ring, FIG. 5 which shows a half-section of a piston unit with a conical coupling ring and an elastic element, FIG. 6 which shows a half-section of a piston unit with a coupling ring and an access opening, FIG. 7 which is a detail illustration of the coupling partners in a clearance end position, FIG. 8 which shows a cross section of hollow piston rod, and FIG. 9 which shows a segmented coupling ring.

FIG. 1 shows a piston unit according to the invention of a working cylinder in a full section.

The piston unit is of multi-part form and has a piston 1 and a piston rod 2, wherein the piston rod 2 has been partially inserted into the piston 1.

Below, the piston 1 and the piston rod 2 will also be described collectively as coupling partners.

According to the invention, the piston 1 and piston rod 2 are coupled to one another by means of a positively locking connection.

The positively locking connection is in the present case achieved by virtue of a coupling ring 4.1 being arranged within the piston unit.

In the present case, the coupling ring 4.1 has a rectangular cross section, wherein according to the invention, coupling rings with other forms of cross section may also be used.

To receive the coupling ring 4.1, the piston 1 has a first annular groove 3.1 and the piston rod 2 has a first annular groove 3.3, wherein the first annular groove 3.1 of the piston 1 is in the form of an encircling internal groove and the first annular groove 3.3 of the piston rod 2 is in the form of an encircling external groove.

The first annular groove 3.1 of the piston 1 is, in the present exemplary embodiment, designed such that it can receive the coupling ring 4.1 fully, and in particular to such an extent as to ensure that the piston rod 2 can be inserted into the piston 1 without complications.

As the piston rod 2 is inserted into the piston 1, the coupling ring 4.1 is pushed into the first annular groove 3.1 of the piston 1 and, in the process, is braced in its bracing direction.

When the piston rod 2 reaches its final assembled position in the piston 1, with the annular grooves 3.1 and 3.3 being situated correspondingly opposite one another, it is made possible for the coupling ring 4.1 to relax in its relaxation direction, enabling the coupling ring 4.1 to engage simultaneously into the annular grooves 3.1 and 3.3.

The positive locking of the coupling of the piston 1 and of the piston rod 2 is realized according to the invention in that, in the final position of the piston rod 2 in the piston 1, that surface of the coupling ring 4.1 which faces toward the piston-side end of the piston rod 2 bears against those walls of the annular grooves 3.1 and 3.3 which face toward the coupling ring 4.1.

The piston rod 2 is thus prevented in an effective manner from possibly being pulled out of the piston 1, in particular during use of a working cylinder which has a piston unit according to the invention.

In order that, as the piston rod 2 is inserted into the piston 1, the coupling ring 4.1 is pushed into the annular groove 3.1 of the piston 1, the piston rod 2 additionally has, on the end facing toward the piston 1, a run-on bevel 5 of encircling form.

As a special technological feature, the external diameter of the piston rod 2 has an oversize in relation to the internal diameter of the piston 1. The oversize has the effect that, in the final assembled position of the piston rod 2, an interference fit and thus frictional locking is produced between said piston rod and the piston 1.

Owing to the frictional locking that is provided, the piston rod 2 and the piston 1 are axially fixed in their position relative to one another without a clearance, whereby the piston 1 is prevented in an effective manner from moving axially relative to the piston rod 2. In this way, abrasion grinding phenomena can be prevented.

Figure 7:
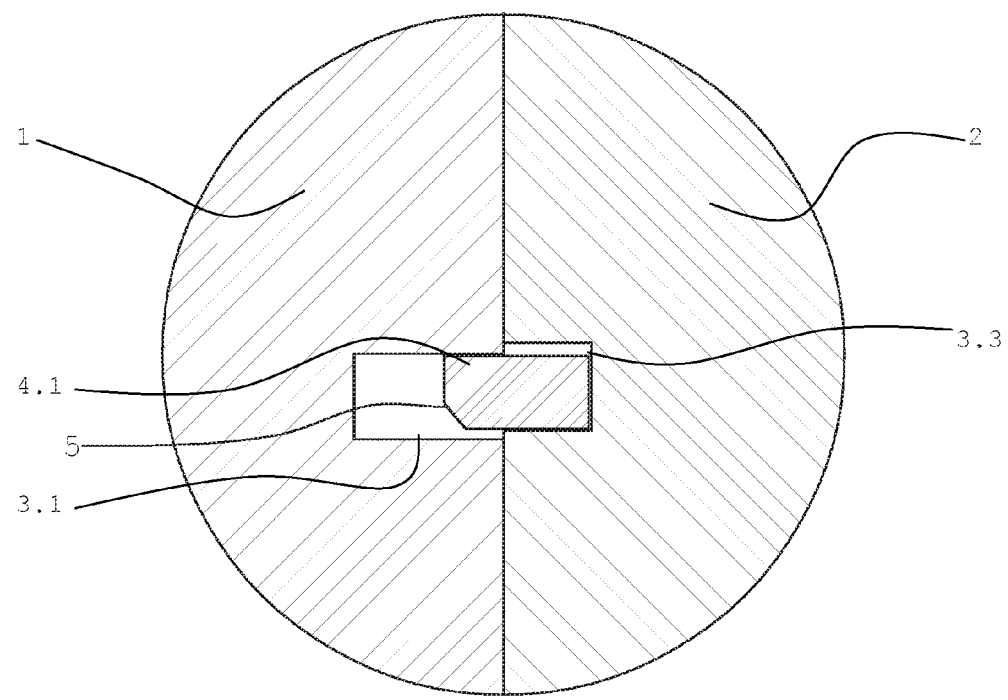
Figure 8:
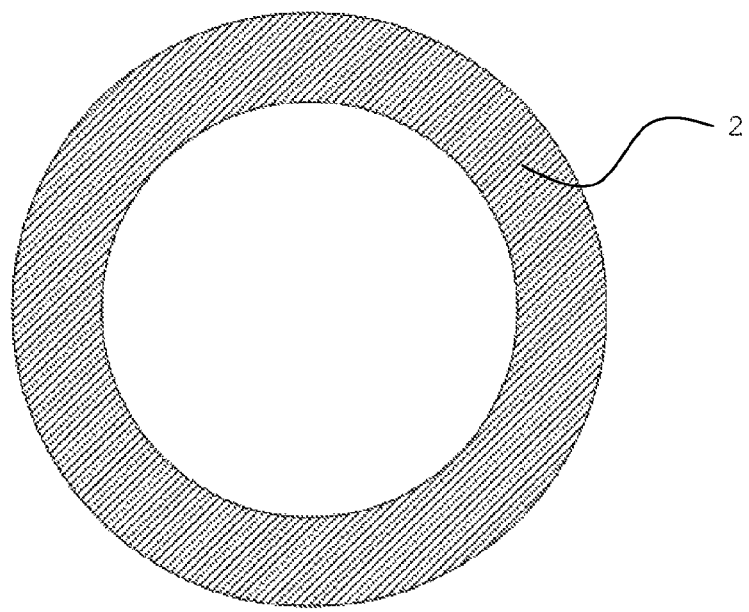
Figure 9:
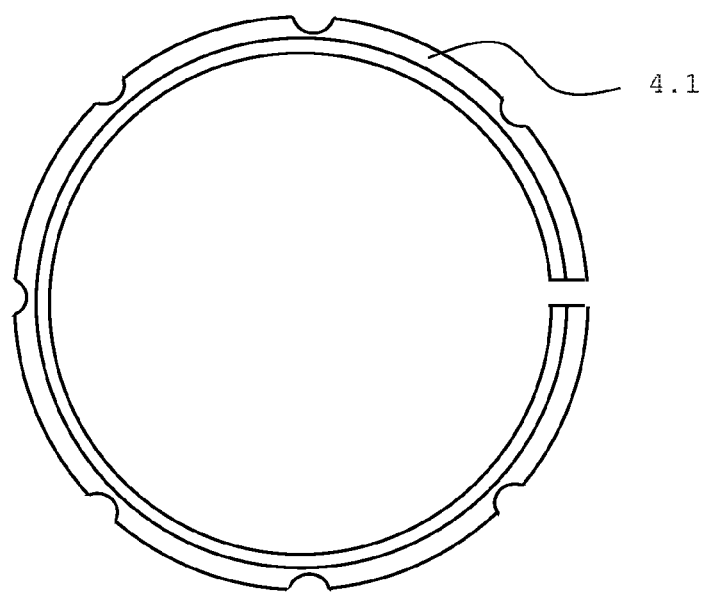

For illustration, reference is made to FIG. 7, which shows, in a detail view, the piston 1 and the piston rod 2 in their clearance end positions and the coupling ring 4.1 in its final position in the annular grooves 3.1 and 3.3 and an oversize—illustrated on an exaggerated scale for illustrative purposes—of the annular grooves 3.1 and 3.3 in relation to the coupling ring 4.1.

FIG. 7 shows the relative position assumed by the piston 1 and piston rod 2 owing to the load in an axial clearance end position.

As a further advantage, the frictional locking that is provided makes it possible for axially acting forces when the working cylinder is subjected to load to be accommodated and for undesired twisting of the piston 1 relative to the piston rod 2 to be prevented.

In particular, owing to the additional accommodation of axial forces by way of the frictional locking, the maximum load and endurance strength of the working cylinder can be optimized.

Figure 2:
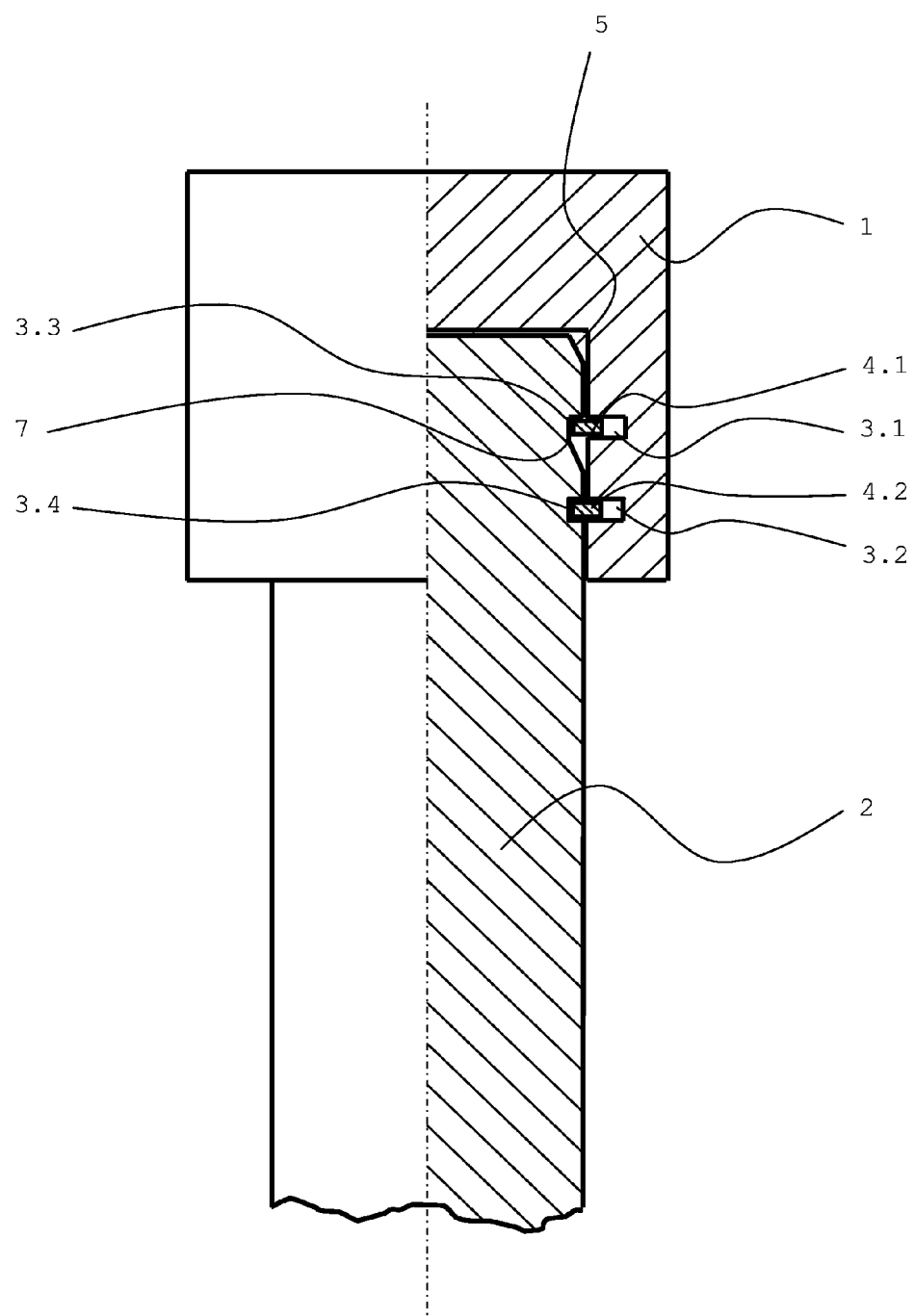

FIG. 2 shows an exemplary embodiment of a piston unit according to the invention in half-section, wherein, to increase the axial load-bearing capacity, the piston unit has two coupling rings 4.1 and 4.2.

In the present case, the coupling ring 4.1 is arranged in a first annular groove 3.1 of the piston 1 and in a first annular groove 3.3 of the piston rod 2.

By contrast, the coupling ring 4.2 is arranged in a second annular groove 3.2 of the piston 1 and in a second annular groove 3.4 of the piston rod 2.

To ensure complete insertion of the piston rod 2 into the piston 1, an annular groove bevel 7 is provided on the annular groove 3.3 of the piston rod 2.

Said annular groove bevel 7 has the effect, in a particularly advantageous manner, that the second coupling ring 4.2, after it relaxes into the annular groove 3.1, can be pushed back by the annular groove bevel 7 into the annular groove 3.3 of the piston 1 again, and thus the insertion of the piston rod 2 into the piston 1 can be continued.

Figure 3:
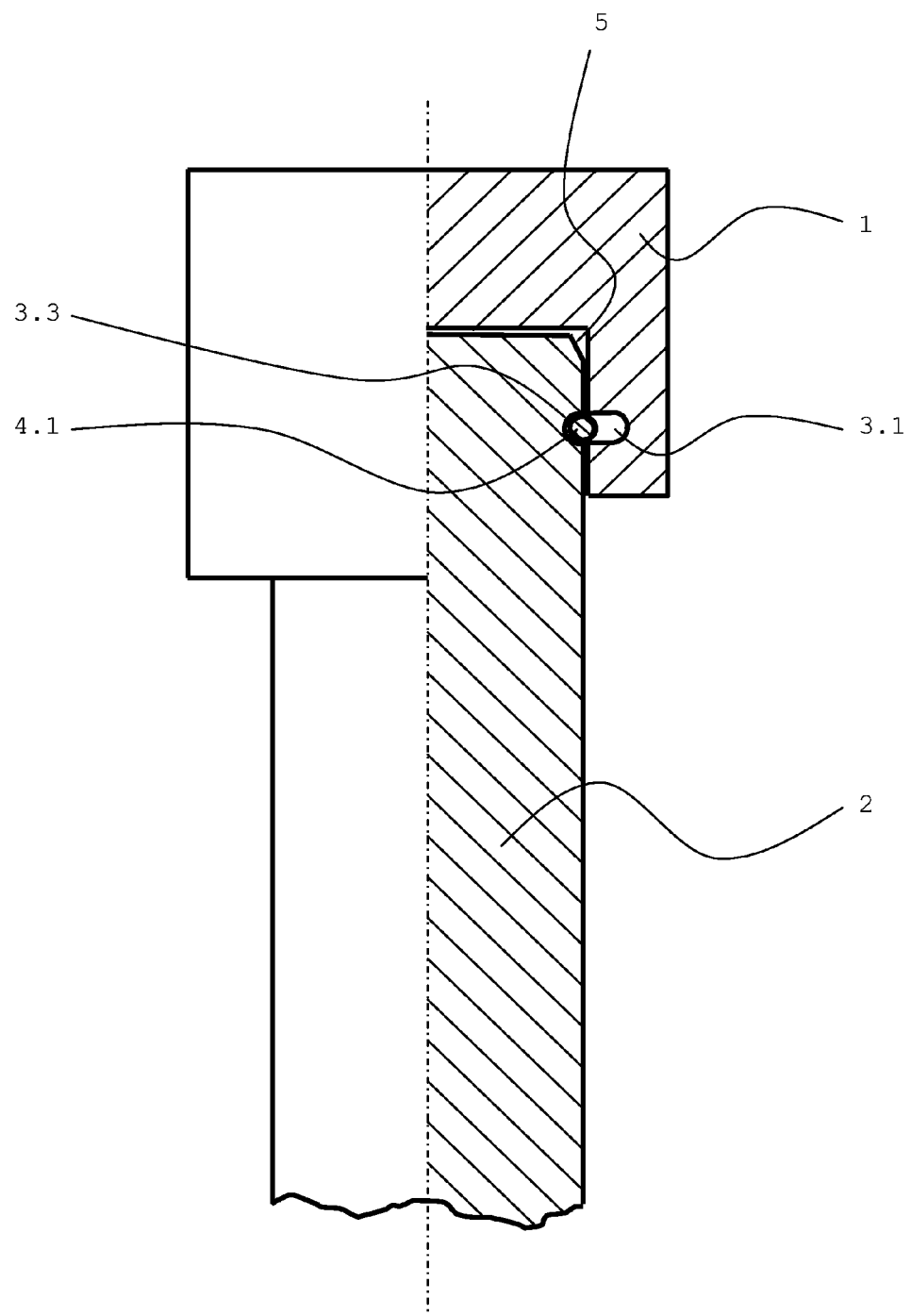

In a further exemplary embodiment as per FIG. 3, the coupling ring 4.1 has a circular cross section.

Such a circular cross section is, in a particularly advantageous manner, associated with a reduction in production costs for the coupling ring 4.1 and with an optimization of the profile of the internal stresses on the coupling ring 4.1 during the bracing thereof.

To realize as large a region as possible in which there is a positive locking action between the coupling ring 4.1 and the annular groove 3.3 of the piston rod 2, said annular groove is adapted in terms of its contour to the cross-sectional geometry of the coupling ring 4.1.

The adaptation of the annular groove contour to the cross section of the coupling ring 4.1 furthermore has the technological advantage that, owing to the resulting roundings of the annular groove contour, notch effects that arise when the positively locking connection is subjected to load can be substantially eliminated.

Furthermore, the annular groove 3.1 has, in its groove base, a rounded contour for preventing notch effects from occurring.

Figure 4:
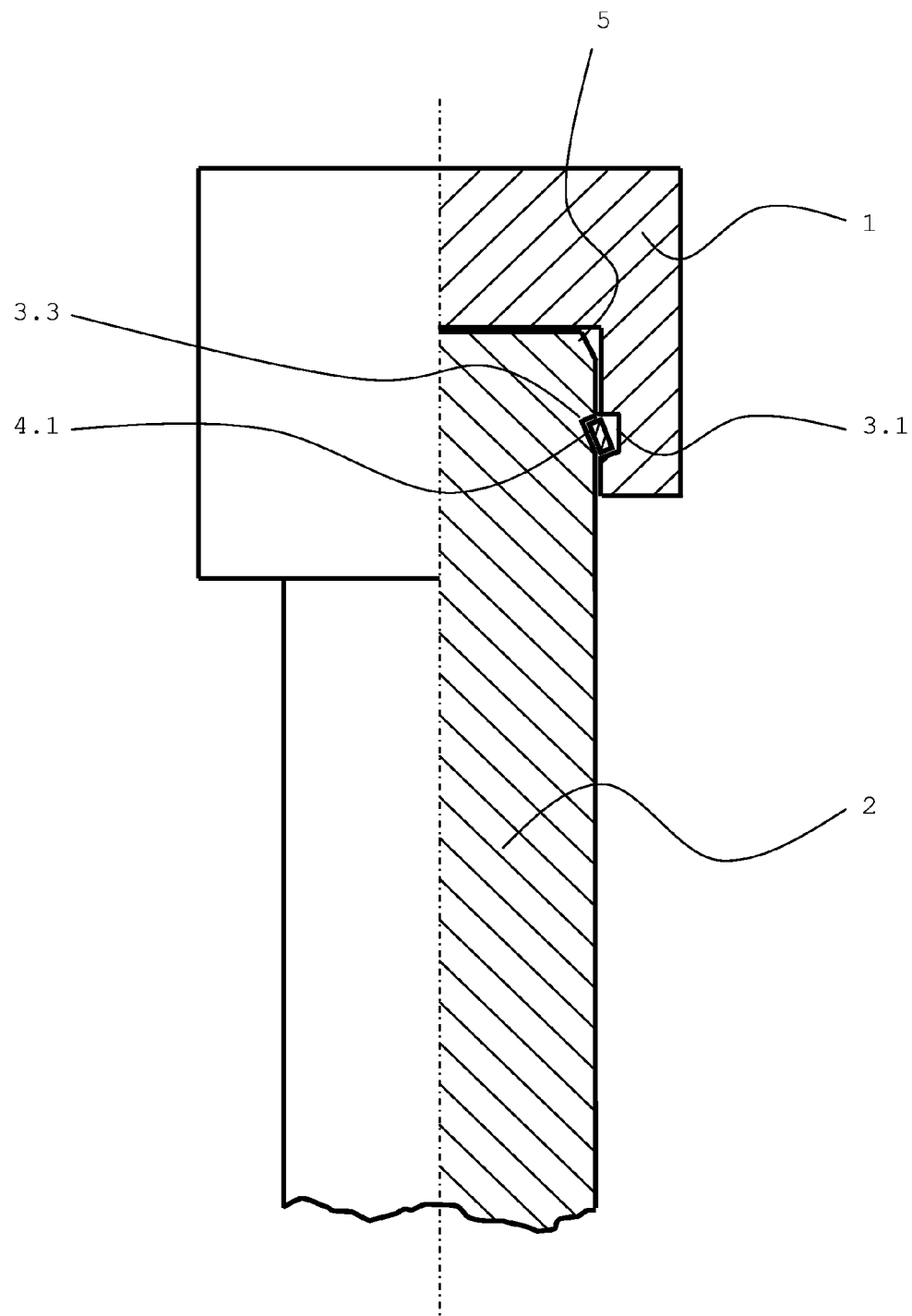

As a further exemplary embodiment, FIG. 4 shows a piston unit according to the invention with a coupling ring 4.1 which is of conical form and which has multiple segments.

In this case, the annular grooves 3.1 and 3.3 are of a geometrical form such that, when the piston rod 2 reaches the final assembled position in the piston 1, the segments of the coupling ring 4.1 at least partially pivot into the annular groove 3.3 of the piston rod 2.

Figure 5:
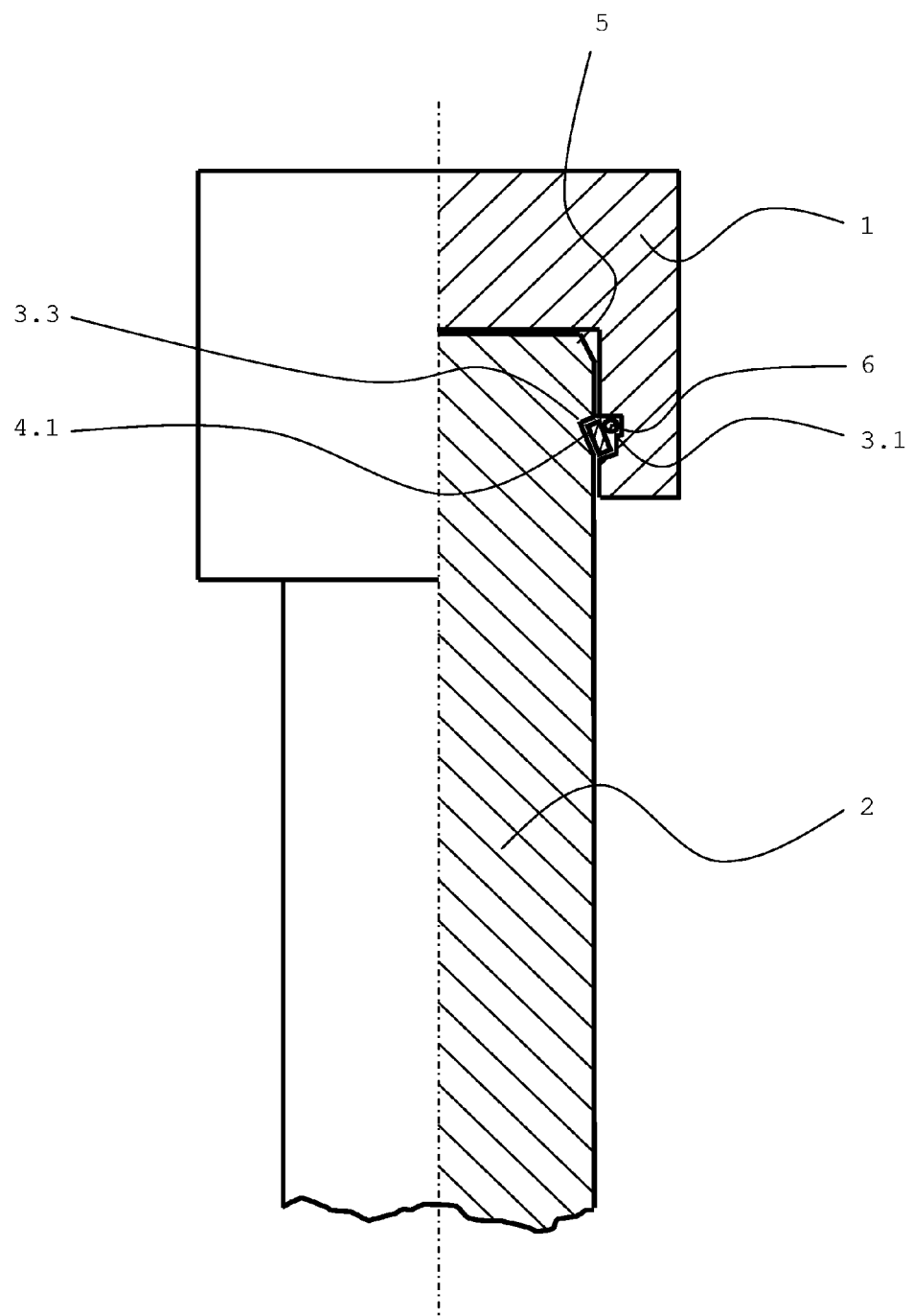

FIG. 5 shows a refinement of the piston unit as per the exemplary embodiment from FIG. 4.

In this case, a piston unit as per FIG. 5 additionally has an elastic element 6 which, according to the invention, is arranged in the annular groove 3.1 of the piston 1.

According to the invention, the elastic element 6 acts radially on the coupling ring 4.1 and thus assists the relaxation thereof when the piston rod 2 reaches the final position in the piston 1.

Furthermore, the elastic element 6 ensures correct seating of the coupling ring 4.1 in the annular grooves 3.1 and 3.3 even in the event of insufficient relaxation of the coupling ring 4.1.

According to the invention, the elastic element 6 may for example be formed by an elastomer element with circular cross section or by a similarly shaped rubber element.

Furthermore, depending on the application, use may also be made of elastic elements with other cross sections.

Figure 6:
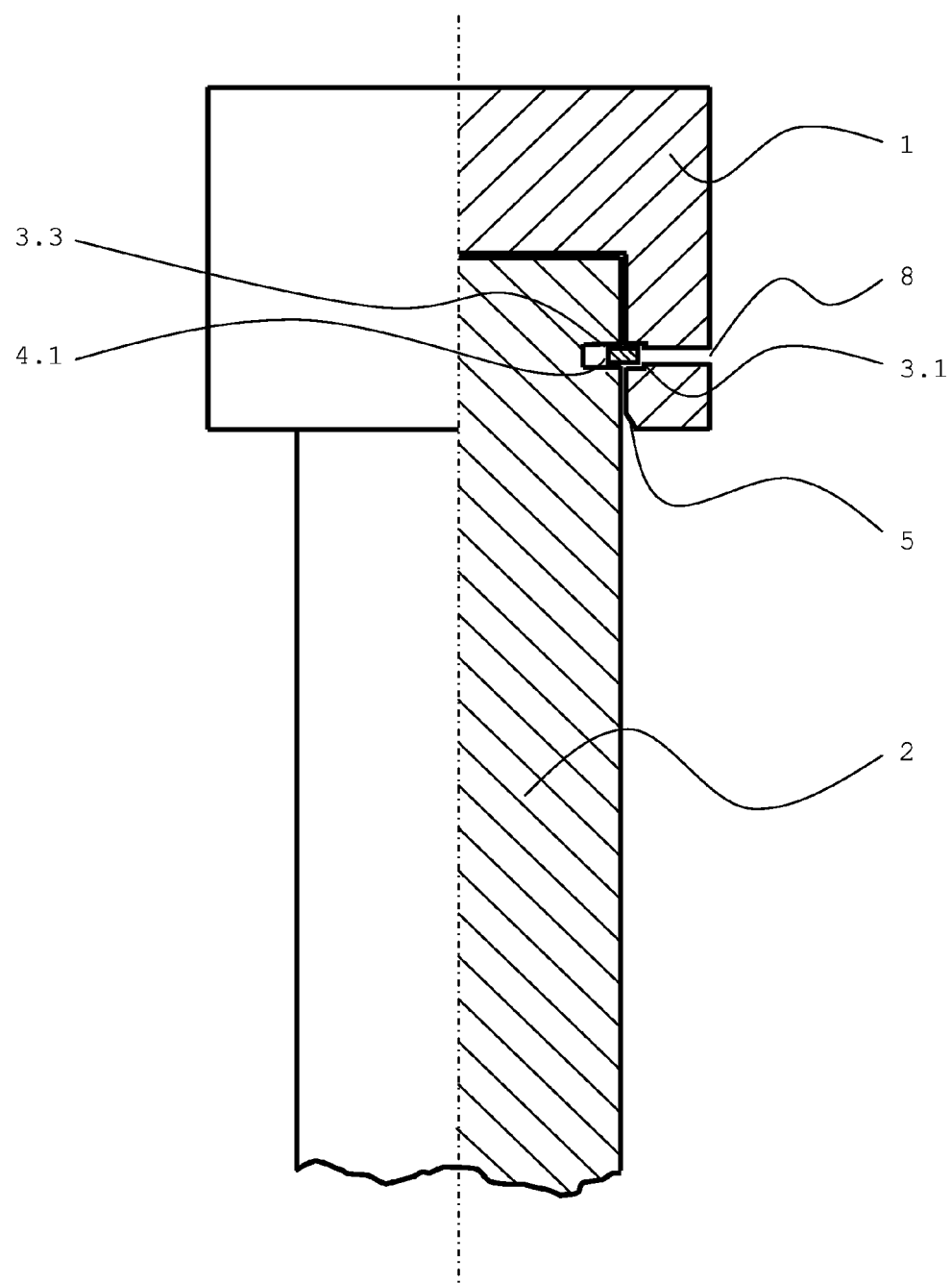

FIG. 6 shows a further exemplary embodiment of a piston unit according to the invention.

In this case, the exemplary embodiment as per FIG. 6 provides firstly that the annular groove which fully receives the coupling ring 4.1 is formed by the annular groove 3.3 of the piston rod 2, and that, in the piston 1, access openings 8 are provided which make it possible for the coupling ring 4.1 to be manipulated from the outside for example by means of a suitable tool (not illustrated) or a screw (not illustrated). The access openings are preferably each arranged with a 120-degree offset.

By means of such external manipulation of the coupling ring 4.1, it is possible for said coupling ring to be pushed back into the annular groove 3.3 of the piston rod 2 again, and thus for the engagement of the coupling ring 4.1 into the annular groove of the piston 1 to be eliminated, in a particularly advantageous manner.

Thus, as a special technological advantage, a releasable connection between the piston 1 and the piston rod 2 is provided.

In a particularly advantageous embodiment, the access openings 8 may be provided with a thread into which a screw (not illustrated) can be screwed, which screw in turn causes the coupling ring 4.1 to be pushed back into the annular groove 3.3 of the piston rod 2.

REFERENCE NUMERALS USED

1 Piston
2 Piston rod
3.1 First annular groove, piston
3.2 Second annular groove, piston
3.3 First annular groove, piston rod
3.4 Second annular groove, piston rod
4.1 First coupling ring
4.2 Second coupling ring
5 Run-on bevel 6 Elastic element
7 Annular groove bevel of the first annular groove, piston rod
8 Access openings

The invention claimed is:
1. A piston unit of a working cylinder, comprising:
 a piston and a piston rod, said piston rod being axially inserted into said piston;
 said piston and said piston rod each having a respective annular groove formed therein, said annular groove of said piston rod being an external groove and said annular groove of said piston being an internal groove, said annular grooves of said piston and said piston rod being disposed opposite one another; and
 a coupling ring for being resiliently braced, said coupling ring, when deformed in a bracing direction, being fully received in said annular groove of one of said piston and said piston rod and said coupling ring, when deformed in a relaxation direction, engaging into said annular grooves of said piston and said piston rod in an engagement, the engagement of said coupling ring into said annular grooves of said piston and said piston rod effecting a positively locking connection between said piston and said piston rod; said piston rod having an oversize in relation to an internal diameter of said piston, for providing a non-positively locking connection between said piston and said piston rod, said piston and said piston rod having different moduli of elasticity, a first area of overlap between said engaged coupling ring and a side wall of said annular groove of one of said piston or said piston rod, having the higher modulus of elasticity, being smaller than a second area of overlap between said coupling ring and a side wall of said annular groove of the other of said piston or said piston rod, having a lower modulus of elasticity.

2. The piston unit according to claim 1, wherein said piston rod is hollow, and said coupling ring is fully received by said annular groove of said piston.

3. The piston unit according to claim 1, wherein said coupling ring or one of said piston or said piston rod which does not fully receive said coupling ring has a run-on bevel, said run-on bevel causes said coupling ring to be fully received in said annular groove of a coupling partner which fully receives said coupling ring.

4. The piston unit according to claim 1, wherein said piston and said piston rod has a further, axially offset annular groove for receiving a further, coupling ring.

5. The piston unit according to claim 1, wherein said coupling ring has a circular cross section.

6. The piston unit according to claim 1, wherein said annular groove in said piston or said piston rod, which fully receives said coupling ring is provided with an elastic element which acts radially on the coupling ring.

7. The piston unit according to claim 1, wherein said piston has access openings, said access openings permit manipulation of the coupling ring from an outside thereof.

8. A piston unit of a working cylinder, comprising:
 a piston and a piston rod, said piston rod being axially inserted into said piston;
 said piston and said piston rod each having a respective annular groove formed therein, said annular groove of said piston rod being an external groove and said annular groove of said piston being an internal groove, said annular grooves of said piston and said piston rod being disposed opposite one another; and
 a coupling ring for being resiliently braced, said coupling ring, when deformed in a bracing direction, being fully received in said annular groove of one of said piston and said piston rod and said coupling ring, when deformed in a relaxation direction, engaging into said annular grooves of said piston and said piston rod in an engagement, the engagement of said coupling ring into said annular grooves of said piston and said piston rod effecting a positively locking connection between said piston and said piston rod; said piston rod having an oversize in relation to an internal diameter of said piston, for providing a non-positively locking connection between said piston and said piston rod, said coupling ring being of conical and segmented form.

9. The piston unit according to claim 8, wherein said piston rod is hollow, and said coupling ring is fully received by said annular groove of said piston.

* * * * *